March 20, 1962     T. O. SEARS     3,025,629
INFLATABLE FISHING CONTAINER
Filed April 7, 1960
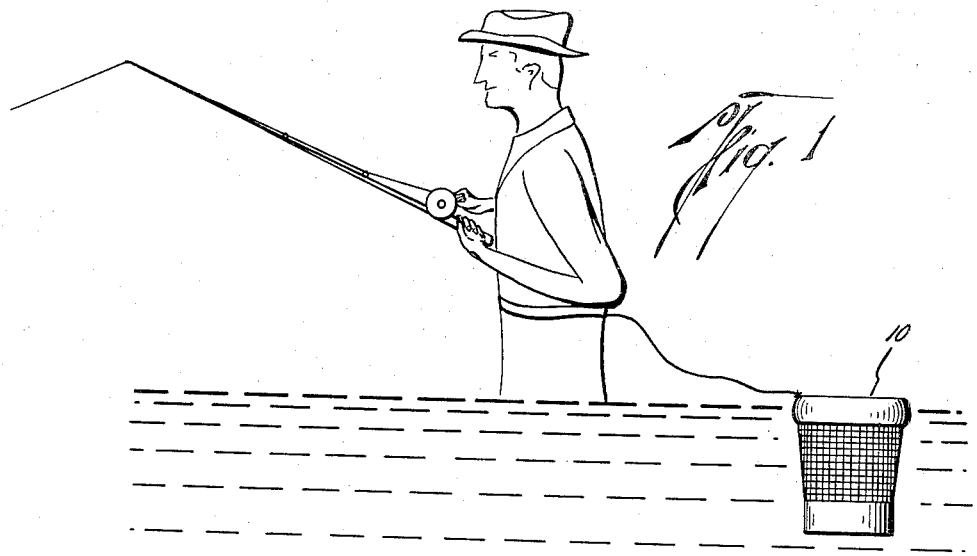
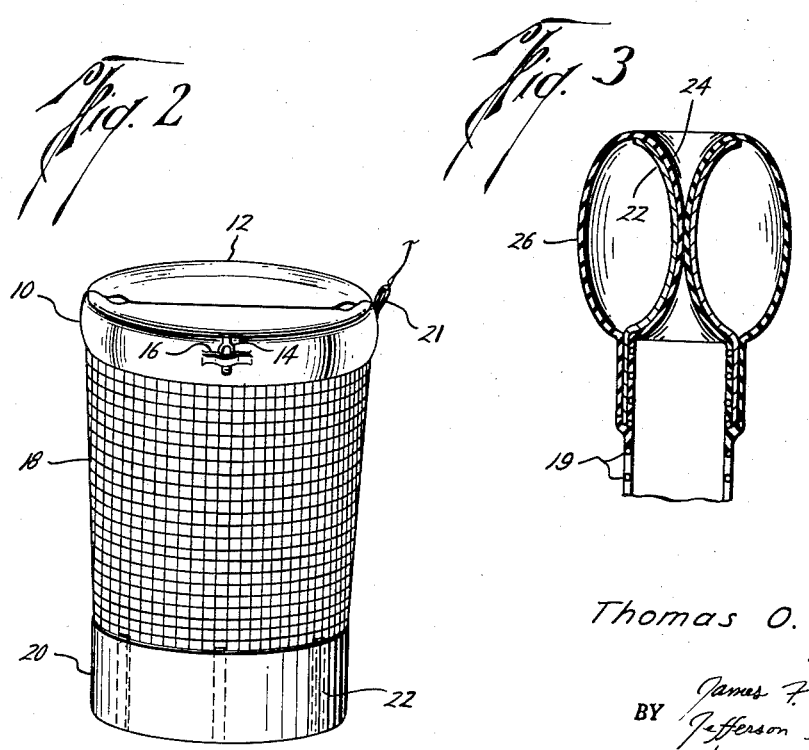
Thomas O. Sears
INVENTOR.
BY James F. Weiler
Jefferson D. Giller
William A. Stout
ATTORNEYS

United States Patent Office 3,025,629
Patented Mar. 20, 1962

3,025,629
INFLATABLE FISHING CONTAINER
Thomas O. Sears, 1429 Richmond Ave., Houston, Tex.
Filed Apr. 7, 1960, Ser. No. 20,721
7 Claims. (Cl. 43—55)

The present invention relates to an improved container for live bait, caught fish, and the like.

An object of this invention is to provide an improved floating container for live bait and caught fish which, accordingly, is not dead weight for the fisherman to carry and which is easily accessible.

Another object of this invention is to provide an improved floating container which allows clean water to readily pass through it thereby preventing the accumulation of stale oxygenless water and the consequent shorter life of the bait.

A further object is to provide a container having a protected water holding portion so that the bait may be carried live without immersing the container, such as when moving from one fishing spot to another.

Another object is to provide a self closing container to prevent the escape of caught fish or live bait and likewise to prevent the ingress of unwanted fish.

A further object is to provide an inflatable container which floats, yet when deflated folds into a small volume.

Yet a further object is to provide a container which is decorative, inexpensive to manufacture, simple and foolproof, and capable of permanent colorful marking.

Other objects and a fuller understanding of the invention may be had by referring to the following description and claims, taken in conjunction with the accompanying drawing in which:

FIGURE 1 is a pictorial sketch of the inflated container in use,

FIGURE 2 is a perspective view of the container, and

FIGURE 3 is a partial sectional view of a corner of the inflated portion of the container, taken along the line 3—3 of FIGURE 2.

Referring now to the drawing, the reference numeral 10 designates generally the container, having an inflatable member 12 which is inflated by means of a conventional tube 14. A conventional valve may be inserted in the tube 14, or the tube may be doubled under a flap 16 thereby retaining the air by pinching off the tube. Attached to the inflatable member 12 is at least one loop 21 so that the container 10 may be secured to the user.

Depending from and attached to the inner surface of the inflatable member 12 is a mesh like bag 18. The mesh 19 is large enough to admit water, yet small enough to retain the bait or fish placed within the bag.

The lower portion of the bag 18 may have a water tight cover 20, so that when the container 10 is removed from the water the cover will hold enough water for the bait or fish to live in temporarily. To prevent collapsing of the cover 20, rather stiff ribs 22 may be placed thereon.

The inflatable member 12 is designed to close when inflated as shown in FIGURE 2. This will prevent the escape of bait or fish during use. This result may be accomplished by bonding the mesh 19 or other material 22 to the inner surface 24 of the inflatable member 12, as seen in FIGURE 3. When the inflatable member is inflated, the outer surface 26 expands more than the restrained inner surface 24, thereby effecting a tight closure. The degree of tightness, of course, depends on the amount of inflation. This result may be heightened by forming the inflatable member 12 originally in a tight oval shape.

The inflatable member 12, when inflated, is a form of annular ring or torus. However, the inner perimeter of the inflatable member 12 is in snug and yieldable contact, therefore resembling a torus whose opposite sides are pushed together. This shape is referred to as a toroid and is clearly shown in FIGURE 2. Thus it is seen that the inflatable member 12, when inflated, advantageously results in a self closing container.

The container 10 may be made out of any flexible waterproof material, for example, rubber, flexible and resilient plastics and the like. In another manner of construction, the bag 18 may be made of a mesh 19 such as is found in bags for fruit, and coated with a waterproof material and secured to an inflatable ring such as disclosed above.

In use, the tube 14 is inflated with air, thereby inflating the inflatable member 12. Upon inflation, the top is closed as previously mentioned. Bait or fish may then be inserted into the bag 18 by forcing open the inflatable member 12. The container may be attached to the user by means of the loop 21. Thereupon the container is placed in the water. Because of the air in the inflatable member 12, the container will float, as is shown in FIGURE 1, while water will circulate through the bag. If bait is desired by the angler, it may readily be removed by reversing the procedure for entrapping it. The container's use for restraining caught fish is obvious.

Due to the water tight portion 20 of the bag 18, the container may be carried from place to place with the bait therein remaining in water. Of course, it may be more convenient to deflate the inflatable member 12 during this mode of use. The ribs 22 will protect the bait at this time. When not in use, the inflatable member is deflated, and the entire container 10 folds into a rather small volume.

Although I have described my invention with a certain degree of particularity, it is understood that the present disclosure has been made only by way of example and that numerous changes in the details of construction and any combination, shape, size, and arrangement of parts may be resorted to without departing from the spirit and scope of the invention as hereinafter claimed.

I claim:

1. In a buoyant fishing container, an inflatable member, said member holding a sufficient volume of air to float said container, said member when inflated having a toroidal shape substantially closing said container, and a bag depending from said member, said bag having an upper perforate portion.

2. In a buoyant fishing container, an inflatable member, a bag depending from said member, said member when inflated having a toroidal shape substantially closing said bag, said bag having an upper perforate portion, a lower imperforate portion, and stiffening means disposed on the lower portion to hold it open.

3. In a buoyant fishing container, a mesh bag, said bag having an imperforate lower portion, vertical stiffening ribs disposed on the lower portion holding it open, and an inflatable member attached to said bag, said member when inflated having a toroidal shape, the inner perimeter of which is in snug and yieldable contact substantially along its length thereby forming an openable closure.

4. In a buoyant fishing container an inflatable member, said member when inflated having an elongate toroidal shape, the inner perimeter of which is in snug and yieldable contact substantially along its major axis thereby forming an openable closure, a bag depending from said member, said bag having an upper perforate portion and a lower imperforate portion and stiffening means disposed on the lower portion to hold it open.

5. The invention of claim 4 including said member when inflated holding a sufficient volume of air to float said container.

6. The invention of claim 5 including at least one loop attached to said member.

7. In a buoyant fishing container, the combination with a mesh bag of, an inflatable member attached to said bag, said member when inflated having a toroidal shape the inner perimeter of which is in snug and yieldable contact substantially along said perimeter, said member holding a sufficient volume of air to float said container.

References Cited in the file of this patent

UNITED STATES PATENTS

| | | |
|---|---|---|
| 2,580,879 | Belokin | Jan. 1, 1952 |
| 2,739,410 | Burdnick | Mar. 27, 1956 |
| 2,809,463 | Buss | Oct. 15, 1957 |

UNITED STATES PATENT OFFICE

Certificate of Correction

Patent No. 3,025,629    March 20, 1962

Thomas O. Sears

It is hereby certified that error appears in the above numbered patent requiring correction and that the said Letters Patent should read as corrected below.

In the drawings, Fig. 2 should appear as shown below instead of as in the patent:

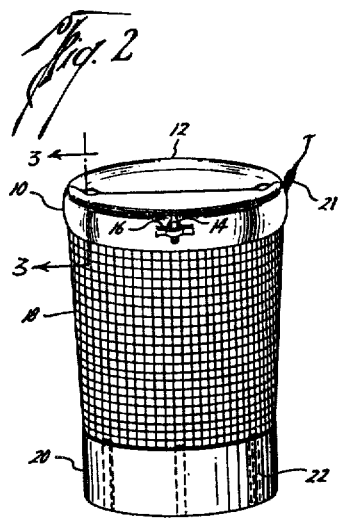

column 4, list of references cited, add the following:

2,241,314    Mohler _____ May 6, 1941

Signed and sealed this 28th day of August 1962.

[SEAL]

Attest:
ESTON G. JOHNSON,
*Attesting Officer.*

DAVID L. LADD,
*Commissioner of Patents.*